US011731225B1

(12) United States Patent
Guo et al.

(10) Patent No.: US 11,731,225 B1
(45) Date of Patent: Aug. 22, 2023

(54) ELECTRO-HYDRAULIC MICRO-DISPLACEMENT PLATFORM, A MICRO-DISPLACEMENT SYSTEM, A PRECISION COMPENSATION SYSTEM, AND ITS METHOD

(71) Applicant: Shandong University, Jinan (CN)

(72) Inventors: Kai Guo, Jinan (CN); Wei He, Jinan (CN); Jie Sun, Jinan (CN); Mingjian Sun, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/098,733

(22) Filed: Jan. 19, 2023

(30) Foreign Application Priority Data

Aug. 16, 2022 (CN) .......................... 202210977896.3

(51) Int. Cl.
*B23Q 1/26* (2006.01)
*B23Q 15/14* (2006.01)
*B23Q 15/12* (2006.01)

(52) U.S. Cl.
CPC ............... *B23Q 1/26* (2013.01); *B23Q 15/12* (2013.01); *B23Q 15/14* (2013.01)

(58) Field of Classification Search
CPC .......... B23Q 1/56; B23Q 1/608; B23Q 1/606; B23Q 1/626; B23Q 1/287; B23Q 1/5437;

(Continued)

(56) References Cited

U.S. PATENT DOCUMENTS

| | | | | |
|---|---|---|---|---|
| 3,046,006 A | * | 7/1962 | Kulicke, Jr. | ........... B23Q 1/262 248/913 |
| 5,265,491 A | * | 11/1993 | Nishiumi | ............... B23Q 1/626 74/89.41 |
| 5,760,500 A | * | 6/1998 | Kondo | ................... H02K 41/02 310/12.21 |

FOREIGN PATENT DOCUMENTS

| | | |
|---|---|---|
| CN | 101214623 A | 7/2008 |
| CN | 102490021 A | 6/2012 |

(Continued)

OTHER PUBLICATIONS

Peng Xiongbin, et al., Modeling and Model Identification of Micro-position-control Hydraulic System, Journal of Mechanical Engineering, 2017, pp. 206-211, vol. 53, No. 22.

*Primary Examiner* — Tyrone V Hall, Jr.

(74) *Attorney, Agent, or Firm* — Bayramoglu Law Offices LLC

(57) ABSTRACT

An electro-hydraulic micro-displacement platform, a micro-displacement system, a precision compensation system, and its method, comprises an x-direction guide rail and a y-direction guide rail slidingly connected with a cross slider respectively. The x-direction guide rail is fixed on the floor of the frame, and a z-direction fixed platform is fixed on the y-direction guide rail. The periphery of the z-direction fixed platform is connected with the side plate of the frame through the x-direction micro-displacement actuator and the y-direction micro-displacement actuator, the z-direction fixed platform is connected with the z-direction floating (Continued)

platform through the first z-direction micro-displacement actuator, the z-direction floating platform is connected with the z-direction auxiliary fixed platform through the second z-direction micro-displacement actuator, and the z-direction fixed platform is fixedly connected with the z-direction auxiliary fixed platform. The z-direction floating platform is connected to the workpiece mounting plate.

14 Claims, 6 Drawing Sheets

(58) Field of Classification Search
CPC . B23Q 1/38; B23Q 1/385; B23Q 5/26; B23Q 5/266; B23Q 5/28; B23Q 15/013; B23Q 15/12; B23Q 15/14
See application file for complete search history.

(56) References Cited

FOREIGN PATENT DOCUMENTS

| | | |
|---|---|---|
| CN | 102969030 A | 3/2013 |
| CN | 104440817 A | 3/2015 |
| CN | 104889951 A | 9/2015 |
| CN | 106737855 A | 5/2017 |
| CN | 109676403 A | 4/2019 |
| CN | 111716355 A | 9/2020 |
| CN | 112405108 A | 2/2021 |
| JP | H09317767 A | 12/1997 |

* cited by examiner

B-B

C-C

//]: #

ELECTRO-HYDRAULIC MICRO-DISPLACEMENT PLATFORM, A MICRO-DISPLACEMENT SYSTEM, A PRECISION COMPENSATION SYSTEM, AND ITS METHOD

CROSS REFERENCE OF THE RELATED APPLICATION

This application claims priority of Chinese application No. 202210977896.3, filed on Aug. 16, 2022, the entire content of which is incorporated herein by reference.

TECHNICAL FIELD

The invention relates to the field of robot processing technology, in particular to an electro-hydraulic micro-displacement platform, a micro-displacement system, a precision compensation system, and its method.

BACKGROUND

The statement in this section only provides the background technical information relates to the invention and does not necessarily constitute prior technology.

In recent years, industrial robots have been widely used in assembly, welding, grinding, polishing, and workpiece loading and unloading because of their advantages in simple structure, stable processing performance, large working space, and low cost. However, the industrial robots are in series open-loop structure, which results in low stiffness and poor absolute positioning accuracy, usually greater than ±1 mm. Therefore, to make the robot more suitable for the field of precision machining, the robot machining deviation compensation technology should be studied. The accuracy of robots is determined by many factors, including robot parts manufacturing, assembly, and the nonlinearity of their joints. In the case of small force on the end effector such as robot grinding and polishing, the geometric deviation is the main deviation source, accounting for about 90% of the total deviation. In milling, drilling, and other applications that require a large cutting force, the high-frequency position deviation caused by the low stiffness of the robot is the main source of deviation. For example, in the milling process of aluminum alloy, the end deviation caused by the milling force is more than 1 mm.

At present, the robot accuracy compensation method is mainly based on the robot parameter identification model and the stiffness model. For example, the robot accuracy compensation method based on the error model and the stiffness model is introduced in the patent CN10673785511, but it needs to study the forward and inverse kinematics, the stiffness model of the robot. The mathematical model is complex, and the compensation accuracy depends on the accuracy of the model. At the same time, due to the low-frequency bandwidth of the industrial robot's joint motor, it is impossible to compensate for the high-frequency pose deviation during the robot processing, and it is difficult to meet the requirements of high-precision machining. Therefore, in milling, drilling, and other occasions where the cutting force is large, the workpiece machining accuracy is often not guaranteed so the application of industrial robots in high-precision machining is limited.

SUMMARY

To solve the above problems, the invention proposes an electro-hydraulic micro-displacement platform, a micro-displacement system, a precision compensation system and its method, which is used for compensating the relative pose deviation between the robot end effector and the workpiece to broaden the application of the robot in high-precision occasions.

To achieve the above purpose, the invention adopts the following technical solution:

In the first aspect, an electro-hydraulic micro-displacement platform is proposed, including a frame, an x-direction guide rail is arranged on the bottom plate of the frame, an x-direction guide rail is slidingly connected with a cross slider, a cross slider is slidingly connected with a y-direction guide rail, a z-direction fixed platform is fixed on the y-direction guide rail, both ends of the z-direction fixed platform x-direction are connected with the x-direction micro-displacement actuator through the y-direction guide bearing, both ends of the z-direction fixed platform y-direction are connected with the y-direction micro-displacement actuator through the x-direction guide bearing, both the x-direction micro-displacement actuator and the y-direction micro-displacement actuator are connected with the side plate of the frame, and the z-direction fixed platform is connected with the z-direction floating platform through the first z-direction micro-displacement actuator. The z-direction floating platform is connected with the z-direction auxiliary fixed platform through the second z-direction micro-displacement actuator, the z-direction fixed platform is fixedly connected with the z-direction auxiliary fixed platform, and the z-direction floating platform is connected with the workpiece mounting plate. Each micro-displacement actuator includes a variable-thickness disk structure I and a variable-thickness disk structure II. The variable-thickness disk structure I is connected with the variable-thickness disk structure II, and a control cavity is formed between the variable-thickness disk structure I and the variable-thickness disk structure II. A drive oil access hole is arranged on the variable-thickness disk structure II, and the control cavity is connected to the drive oil access hole.

In the second aspect, an electro-hydraulic micro-displacement system is proposed, including an electro-hydraulic micro-displacement platform disclosed in the first aspect and three hydraulic drive systems, two x-direction micro-displacement actuators, two y-direction micro-displacement actuators and two z-direction micro-displacement actuators are connected to the three hydraulic drive systems one by one. Each hydraulic drive system includes a controller, a hydraulic pump, a proportional valve, overflow valves, and a pressure sensor. The hydraulic pump is connected with the oil inlet of the proportional valve, and the two oil outlets of the proportional valve are respectively connected with the drive oil access holes of the two micro-displacement actuators. The overflow valves are respectively arranged on the pipeline connecting the hydraulic pump with the oil inlet, and the pipeline connecting the oil outlet with the drive oil access hole. The pressure sensor is used to obtain the pressure in the control cavity of each micro-displacement actuator, and the controller is used to calculate the output force of each micro-displacement actuator according to the pressure in the control cavity and is also used to obtain the output displacement of each micro-displacement actuator. The output displacement of each micro-displacement actuator is compared with the expected displacement to obtain the control signal, and the proportional valve is controlled by the control signal.

In the third aspect, a robot precision compensation system is proposed, including a robot body, an end effector, an electro-hydraulic micro-displacement system disclosed in the second aspect, a measurement system, and a control center. The end effector is connected to the robot body, and three hydraulic drive systems in the electro-hydraulic micro-displacement system form a hydraulic station. An electro-hydraulic micro-displacement platform is used to place the workpiece, or an electro-hydraulic micro-displacement platform is connected between the end effector and the robot body. The measurement system is used to obtain the real-time position of the end effector, and the control center is used to obtain the position deviation according to the real-time position and the ideal position of the end effector. The position deviation is decomposed into low-frequency position deviation and high-frequency position deviation. The motion command of the robot body is calculated by the low-frequency position deviation, and the motion command is used to control the motion of the robot body to compensate for the low-frequency position deviation. The high-frequency command is calculated by the high-frequency position deviation, and the high-frequency command is sent to the hydraulic station. The hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

In the fourth aspect, a compensation method of robot precision compensation system is proposed, including:

Obtaining the real-time position of the end effector;

Obtaining the position deviation according to the real-time position and ideal position of the end effector;

Decomposing the position deviation into low-frequency position deviation and high-frequency position deviation.

Calculating the motion command of the robot body by the low-frequency position deviation, and controlling the motion of the robot body by the motion command to compensate for the low-frequency position deviation.

The high-frequency command is calculated by the high-frequency position deviation, and the high-frequency command is sent to the hydraulic station. The hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

Compared with the existing technology, the beneficial effect of the invention is:

The electro-hydraulic micro-displacement platform proposed in this invention is driven by a micro-displacement actuator. The micro-displacement actuator outputs axial displacement based on the elastic deformation of the material. The design of the static seal is adopted. There is no kinematic pair inside the structure, which effectively avoids the inherent friction, leakage, hysteresis, creep, and other non-linear characteristics of the traditional hydraulic actuator reducing the difficulty of high-precision displacement control and realizing the sub-micron high-precision positioning of large-quality workpieces and end-effectors under high cutting force. Based on this, according to the frequency response of the robot body, the position deviation is decomposed into low-frequency position deviation and high-frequency position deviation. The low-frequency and large-stroke position deviation are compensated by the robot itself, and the high-frequency and micro-stroke position deviation is compensated by the electro-hydraulic micro-displacement platform. It effectively avoids the situation that the position deviation between the end-effector and the workpiece exceeds the stroke of the electro-hydraulic micro-displacement platform, so that the relative position accuracy of the end-effector and the workpiece does not depend on the accuracy of the robot itself. It can reduce the position deviation between the end effector and the workpiece to the positioning accuracy of the electro-hydraulic micro-displacement platform, thereby improving the machining accuracy of the workpiece.

The advantages of additional aspects of this invention will be given in the following description and part of them will become apparent from the following description or learned through the practice of this invention.

BRIEF DESCRIPTION OF THE DRAWINGS

The appended drawings of the specification, which form part of this application, are used to provide a further understanding of this application. The schematic embodiment and its explanation of this application are used to explain this application, which does not constitute an improper qualification of this application.

Figure 1:
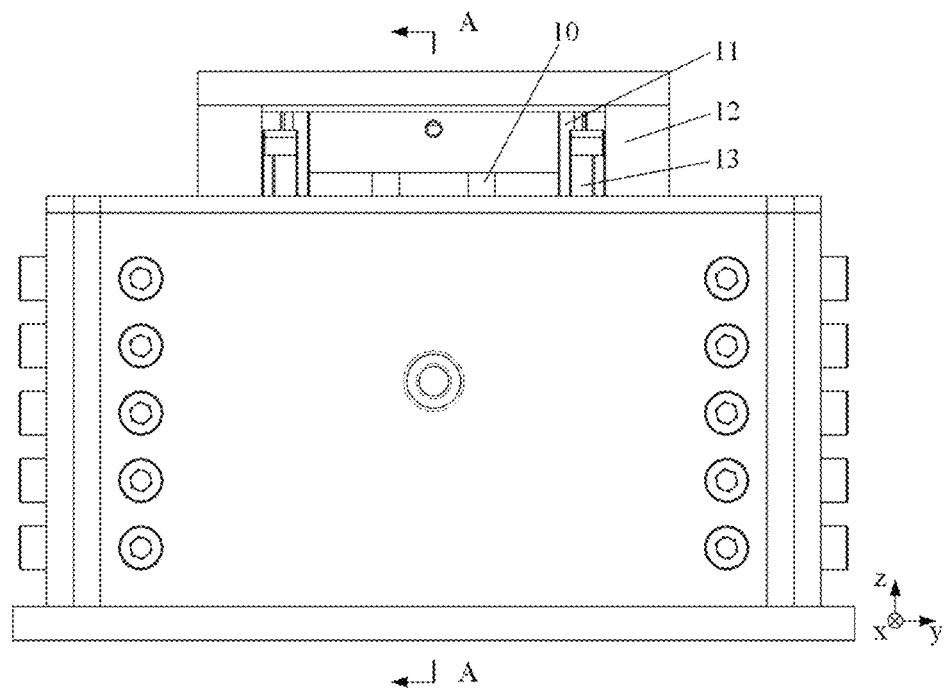
FIG. 1 is the outline of the electro-hydraulic micro-displacement platform of embodiment 1.
Figure 2:
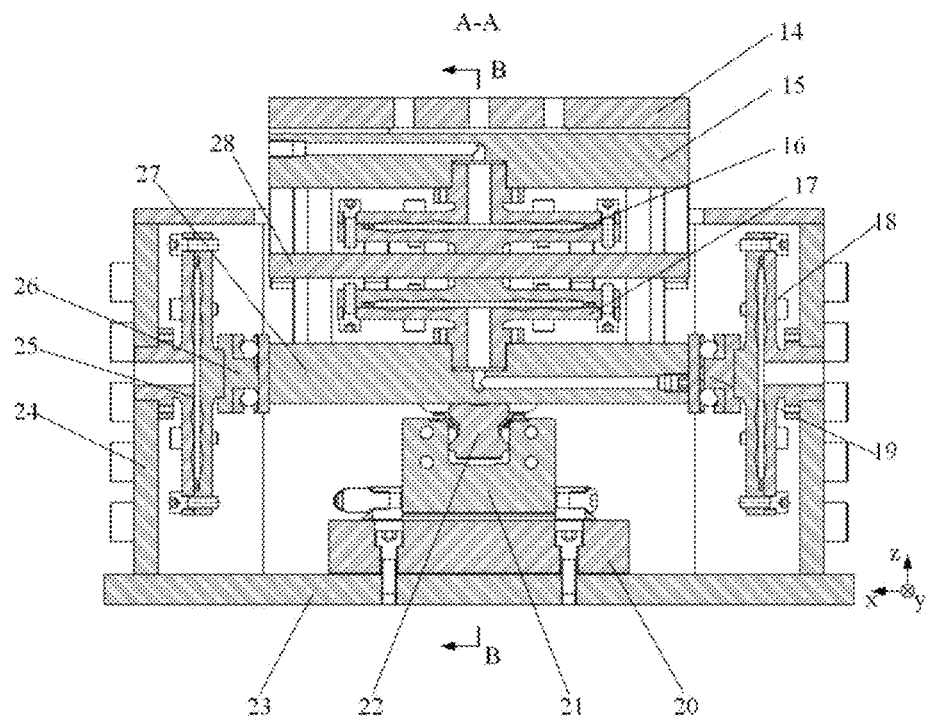
FIG. 2 is the A-A structure sectional view of the electro-hydraulic micro-displacement platform in embodiment 1.
Figure 3:
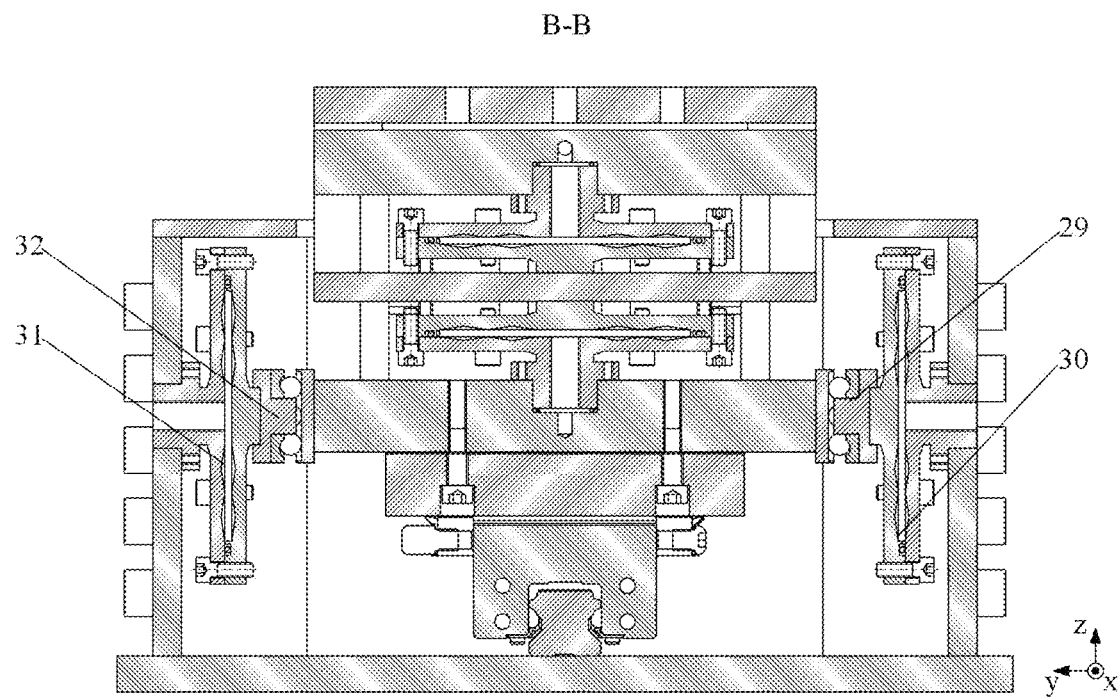
FIG. 3 is the B-B structure sectional view of the electro-hydraulic micro-displacement platform in embodiment 1.

Among them: 1, robot body; 2, control center; 3, end effector; 4, end effector positioning target ball; 5, end flange; 6, electro-hydraulic micro-displacement platform; 7, workpiece; 8, hydraulic station; 9, measurement system; 10, screws; 11, z-direction guide rail; 12, supporting block; 13, z-direction slider; 14, workpiece mounting plate; 15, z-direction auxiliary fixed platform; 16, the second z-direction micro-displacement actuator; 17, the first z-direction micro-displacement actuator; 18, the first x-direction micro-displacement actuator; 19, the first y-direction guide bearing; 20, x-direction guide rail; 21, cross slider; 22, y-direction guide rail; 23, floor; 24, side plate; 25, second x-direction micro-displacement actuator; 26, the second y-direction guide bearing; 27, z-direction fixed platform; 28, z-direction floating platform; 29, the first x-direction guide bearing; 30, the first y-direction micro-displacement actuator; 31, the second y-direction micro-displacement actuator; 32, the second x-direction guide bearing; 33, pump station motor; 34, hydraulic pump; 35, the first relief valve; 36, proportional valve; 37, the second relief valve; 38, the third relief valve; 39, the first pressure sensor; 40, the second pressure sensor; 41, controller; 42, thickened plate structure I; 43, thickened plate structure II; 44, sealing ring; 45, installation flange; 46, flange thread hole; 47, drive oil access hole; 48, connecting screws; 49, sealing groove; 50, stiffness weakening area; 51, stiffness enhancement area; 52, convex platform; 53, workpiece clamping platform.

DETAILED DESCRIPTION OF THE EMBODIMENTS

The following is a further explanation of the invention in combination with drawings and embodiments.

It should be noted that the following details are illustrative and are intended to provide further clarification on this application. Unless otherwise indicated, all technical and scientific terms used herein have the same meaning as those commonly understood by ordinary technicians in the technical field to which this application relates.

It should be noted that the terminology used here is only to describe the embodiments, not to limit the example implementation method according to this application. As used here, the singular form is also intended to include the plural form unless explicitly stated in the context. In addition, it should be understood that when the terms 'include' and/or 'includes' are used in this specification, they indicate the presence of features, steps, operations, devices, components, and/or combinations of them.

In the present invention, terms such as 'up', 'down', 'left', 'right', 'front', 'back', 'vertical', 'horizontal', 'side', and 'bottom' indicate the orientation or positional relationship based on the orientation or positional relationship shown in the accompanying drawings, which is only a relational word determined to facilitate the description of the structural relationship of the components or elements of the present invention, and does not specifically refer to any component or element in the present invention and cannot be understood as a limitation to the present invention.

In this invention, terms such as 'fixed connection', 'joined by', 'connected', etc. should be understood in a broad sense, indicating that it can be a fixed connection, an integrated connection, or a detachable connection; it can be directly connected or indirectly connected through an intermediary. For the relevant scientific research or technical personnel in this field, the specific meaning of the above terms in the invention can be determined according to the specific situation, which cannot be understood as a restriction on the invention.

Embodiment 1

In this embodiment, an electro-hydraulic micro-displacement platform is disclosed. There are three moving axes: the x-axis, y-axis, and z-axis. Each moving axis is driven by a set of micro-displacement actuators. The x-axis and y-axis are guided by a two-dimensional integrated cross-guide rail. The two-dimensional integrated cross guide rail is fixed to the guide rail and the bottom plate, the y-direction guide rail is fixed to the z-direction fixed platform, and the z-direction fixed platform can realize two-dimensional plane motion. The z-direction fixed platform is connected to the z-direction floating platform through the first z-direction micro-displacement actuator, the z-direction floating platform is connected to the z-direction auxiliary fixed platform through the second z-direction micro-displacement actuator, the z-direction fixed platform is fixedly connected to the z-direction auxiliary fixed platform, and the z-direction floating platform is connected to the workpiece mounting plate. The first z-direction micro-displacement actuator is fixed on the z-direction fixed platform, the second z-direction micro-displacement actuator is fixed on the z-direction auxiliary fixed platform, and the first and second z-direction micro-displacement actuators jointly drive the z-direction floating platform to realize z-direction motion. The displacements of the x-axis, y-axis, and z-axis are measured by the respective guide rail slider systems with displacement measurement functions. The z-direction floating platform is driven by three sets of micro-displacement actuators to achieve three directions of composite movement.

As shown in FIGS. 1-5, the x-direction movement of the workpiece mounting plate 14 is driven by two x-direction micro-displacement actuators. The two x-direction micro-displacement actuators are the first x-direction micro-displacement actuator 18 and the second x-direction micro-displacement actuator 25, respectively. The y-direction movement is driven by two y-direction micro-displacement actuators. The two y-direction micro-displacement actuators are the first y-direction micro-displacement actuator 30 and the second y-direction micro-displacement actuator 31, respectively. The z-direction movement is driven by two z-direction micro-displacement actuators. The x-direction and y-direction movements of the z-direction fixed platform 27 are guided by the cross slider 21, and the x-direction guide 20 provides the x-direction guidance for the z-direction fixed platform 27. The x-direction guide rail 20 is fixedly connected with the floor 23 by installing screws, the y-direction guide rail 22 provides y-direction guidance for the z-direction fixed platform 27, the y-direction guide rail 22 is fixedly connected with the z-direction fixed platform 27 by installing screws, the first x-direction micro-displacement actuator 18 and the second x-direction micro-displacement actuator 25 are arranged between the z-direction fixed platform 27 and the first y-direction guide bearing 19 and the second y-direction guide bearing 26, the first y-direction micro-displacement actuator 30 and the second y-direction micro-displacement actuator 31 are arranged between the z-direction fixed platform 27 and the first x-direction guide bearing 29 and the second x-direction guide bearing 32; the z-direction fixed platform 27 is connected to the z-direction floating platform 28 through the first z-direction micro-displacement actuator 17, and the z-direction floating platform 28 is connected to the z-direction auxiliary fixed platform 15 through the second z-direction micro-displacement actuator 16; The first z-direction micro-displacement actuator 17 is fixed on the z-direction fixed platform 27 by bolts, the second z-direction micro-displacement actuator 16 is fixed on the z-direction auxiliary fixed platform 15 by bolts, the z-direction fixed platform 27 is fixed on the z-direction auxiliary fixed platform 15 by uniformly distributed screws 10, the z-direction floating platform 28 is located between the first z-direction micro-displacement actuator 17 and the second z-direction micro-displacement actuator 16, and drives the z-direction floating platform 28 to move up and down by the first z-direction micro-displacement actuator 17 and the second z-direction micro-displacement actuator 16. The z-direction floating platform 28 is connected with the z-direction slider 13, and the z-direction slider 13 is connected with the z-direction guide rail 11 so that the z-direction slider 13 can slide up and down along the z-direction guide rail 11. The two ends of the z-direction guide rail 11 are respectively connected with the z-direction fixed platform 27 and the z-direction auxiliary fixed platform 15. The z-direction floating platform 28 is connected with the workpiece mounting plate 14 through the supporting block 12, and the z-direction guide rail 11 and the z-direction slider 13 guide the movement of the z-direction floating platform 28.

The displacements of the x-axis, y-axis, and z-axis are measured by the guide rail slider system with displacement measurement function respectively. The workpiece mounting plate 14 is driven by three sets of micro-displacement actuators to realize the combined movement in three directions.

Specifically, an electro-hydraulic micro-displacement platform includes a frame. The x-direction guide rail 20 is set on the bottom plate of the frame, the x-direction guide rail 20 is slidingly connected with the cross slider 21, the cross slider 21 can slide along the x-direction guide rail 20, the cross slider 21 is slidingly connected with the y-direction guide rail 22 and can slide along the y-direction guide rail 22. The z-direction fixed platform 27 is fixed on the y-direction guide rail 22. The two ends of the z-direction fixed platform 27 are connected with two x-direction micro-displacement actuators by two y-direction guide bearings in x direction, and the two ends of the z-direction fixed platform 27 are connected with two y-direction micro-displacement actuators by two x-direction guide bearings in the y-direction. Two x-direction micro-displacement actuators and two y-direction micro-displacement actuators are connected with the side plate 24 of the frame.

The two y-direction guide bearings and two x-direction guide bearings both include linear guides and sliders. The circumference of the z-direction fixed platform 27 is connected to the linear guides of two y-direction guide bearings and two x-direction guide bearings, respectively. The sliders of two x-direction guide bearings and two y-direction guide bearings are connected to the convex platforms of two x-direction micro-displacement actuators and two y-direction micro-displacement actuators and can move along their respective linear guides.

Each micro displacement actuator comprises a thickened plate structure I 42 and a thickened plate structure II 43. The thickened plate structure I 42 is connected with the thickened plate structure II 43, and a control cavity is formed between the thickened plate structure I 42 and the thickened plate structure II 43. A driving oil access hole 47 is arranged on the thickened plate structure II 43, and the control cavity is connected with the driving oil access hole 47.

The slider guide system composed of x-direction guide rail 20, y-direction guide rail 22 and cross slider 21, z-direction guide rail 11, and z-direction slider 13 has a displacement measurement function, which can measure the displacement of z-direction floating platform on the x-axis, y-axis, and z-axis.

Figure 4:
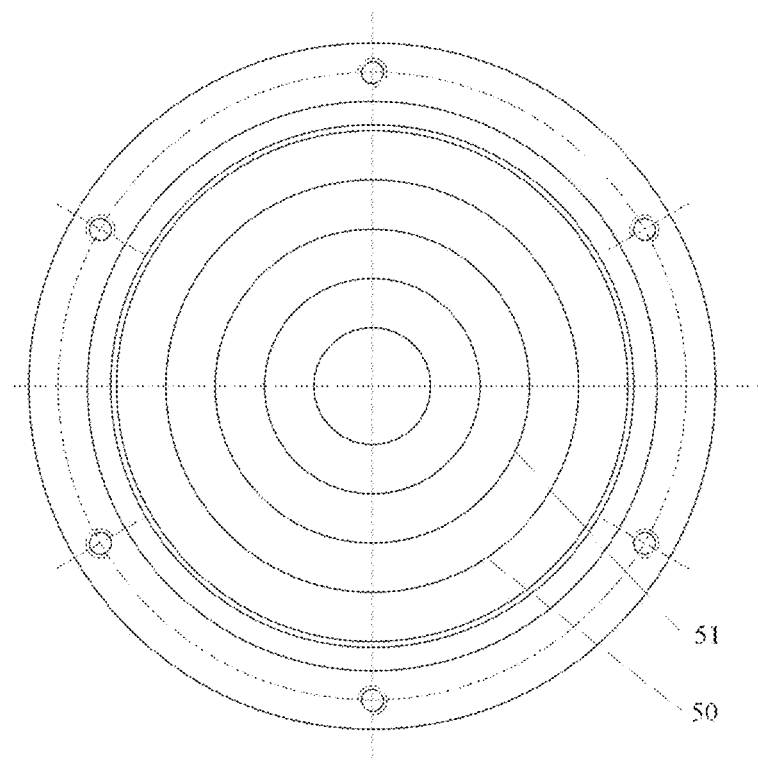
FIG. 4 is the structure sectional view of the micro-displacement actuator disclosed in embodiment 1.
Figure 5:
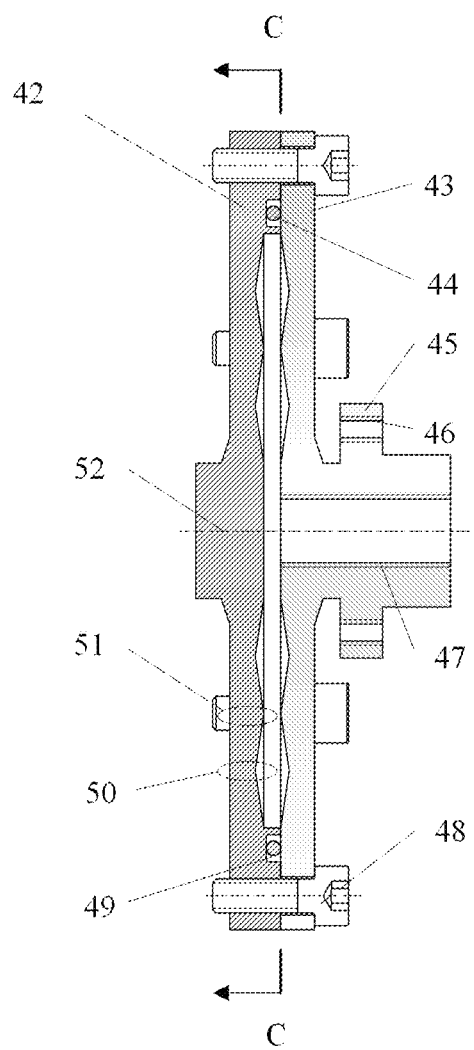
FIG. 5 is the C-C structure sectional view of the micro-displacement actuator disclosed in embodiment 1.

As shown in FIG. 4 and FIG. 5, the second end face of the thickened plate structure I 42 is connected with the first end face of the thickened plate structure II 43, and a control cavity is formed between the two. The installation flange 45 is arranged on the second end face of the thickened plate structure II 43. During operation, the installation flange 45 is fixed with the side plate or fixed platform by connecting screw 48 through the flange thread hole 46. The center of the first end face of the thickened plate structure I 42 has a circular convex platform 52, and the displacement of the micro-displacement actuator is output by the convex platform 52.

The sealing ring is set at the connection between the thickened plate structure I 42 and the thickened plate structure II 43 to ensure that the oil in the control cavity does not leak from the connection. It is preferred to set the sealing groove 49 on the second end surface of the thickened plate structure I 42, and the sealing groove 49 is equipped with the sealing ring 44.

The radial alternating distribution of stiffness weakening region 50 and stiffness enhancement region 51 along the actuator thickening disk structure I 42 and thickening disk structure II 43; by alternately arranging the stiffness enhancement area 51 and the stiffness weakening area 50, the stress distribution along the radius direction is optimized, the stress concentration of the disc structure is reduced and the deformation of the thickened disc structure is fully exerted.

Figure 6:
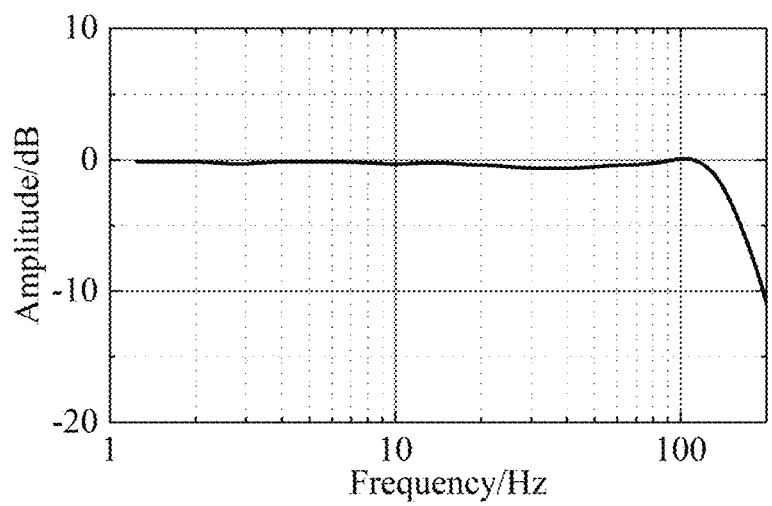
FIG. 6 is the amplitude-frequency diagram of the x-direction frequency response of the electro-hydraulic micro-displacement platform in embodiment 1.
Figure 7:
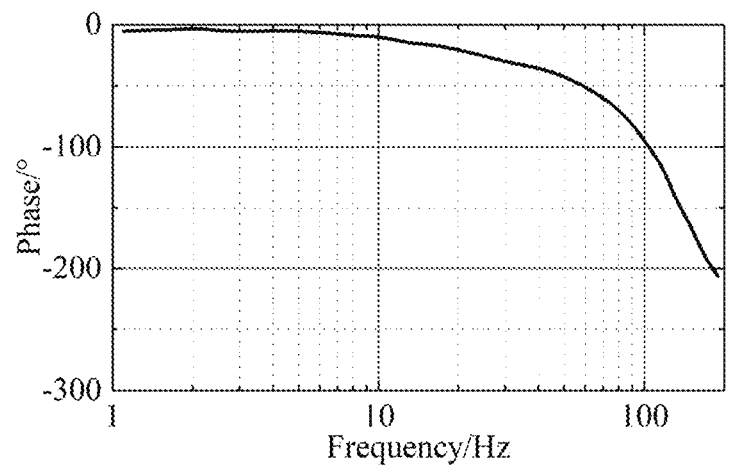
FIG. 7 is the phase-frequency diagram of the x-direction frequency response of the electro-hydraulic micro-displacement platform in embodiment 1.

The internal control cavity pressure of the micro-displacement actuator is controlled by the closed-loop control of the hydraulic drive system, and the frequency response of the displacement control is completely determined by the frequency response of the hydraulic drive system. At the same time, the friction-free and zero-leakage characteristics of the actuator help to achieve high-precision displacement control. FIG. 6 and FIG. 7 are the frequency response diagrams of the x-direction micro-displacement actuator under the control of the high-frequency response servo proportional valve. Among them, FIG. 6 is the amplitude-frequency diagram and FIG. 7 is the phase-frequency diagram.

The electro-hydraulic micro-displacement platform disclosed in this embodiment is driven by a micro-displacement actuator. The micro-displacement actuator outputs axial displacement based on the elastic deformation of the material. The design of the static seal is adopted. There is no kinematic pair inside the structure, which effectively avoids the inherent friction, leakage, hysteresis, creep, and other non-linear characteristics of the traditional hydraulic actuator reducing the difficulty of high-precision displacement control and realizing the sub-micron high-precision positioning of large-quality workpieces and end-effectors under high cutting force.

Embodiment 2

In this embodiment, an electro-hydraulic micro-displacement system is disclosed, including an electro-hydraulic micro-displacement platform disclosed in embodiment 1 and three hydraulic drive systems. Two x-direction micro-displacement actuators, two y-direction micro-displacement actuators, and two z-direction micro-displacement actuators are connected one-to-one with three hydraulic drive systems. Each hydraulic drive system includes a controller, a hydraulic pump, a proportional valve, overflow valves, and a pressure sensor. The hydraulic pump is connected with the oil inlet of the proportional valve, and the two oil outlets of the proportional valve are respectively connected with the drive oil access holes of the two micro-displacement actuators. The overflow valves are respectively arranged on the pipeline connecting the hydraulic pump with the oil inlet, and the pipeline connecting the oil outlet with the drive oil access hole. The pressure sensor is used to obtain the pressure in the control cavity of each micro-displacement actuator, and the controller is used to calculate the output force of each micro-displacement actuator according to the pressure in the control cavity and is also used to obtain the output displacement of each micro-displacement actuator. The output displacement of each micro-displacement actuator is compared with the expected displacement to obtain the control signal, and the proportional valve is controlled by the control signal.

The output displacement of the x-direction, y-direction, and z-direction micro-displacement actuators is measured by the guide slider system with displacement measurement function respectively. The three groups of micro-displacement actuators are driven together to realize the compound movement of the z-direction floating platform in three directions.

The hydraulic pump is driven by the pump station motor to output high-pressure oil.

The proportional valve is a proportional directional valve, a proportional pressure-reducing valve, a proportional relief valve, or a servo direction valve.

Figure 8:
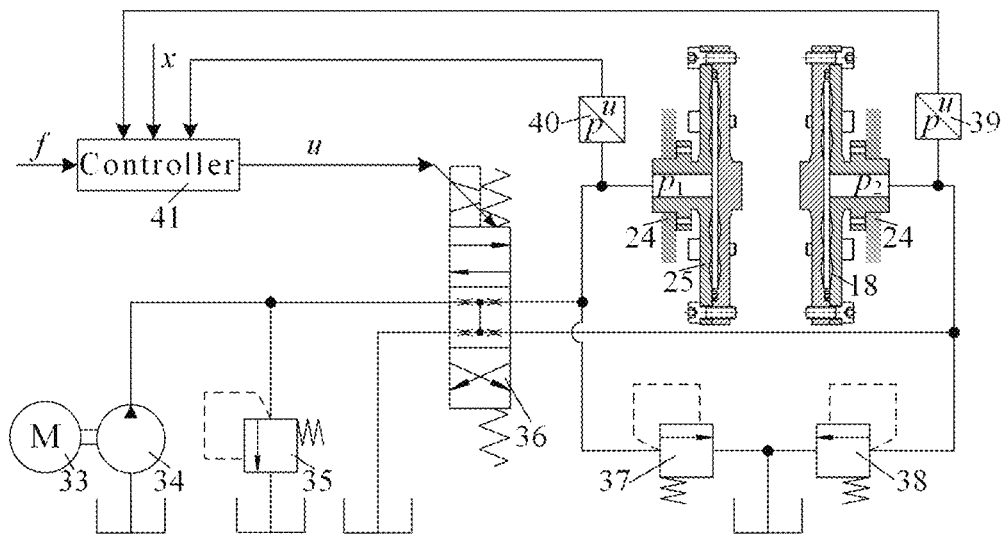
FIG. 8 is the hydraulic drive control circuit diagram of the x-direction micro-displacement actuator of the system in embodiment 2.

The connection oil circuits of each hydraulic drive system and two micro-displacement actuators are the same. Take the connection oil circuit of two x-direction micro-displacement actuators and the hydraulic drive system is illustrated as an example, as shown in FIG. 8. The hydraulic drive system includes pump station motor 33, hydraulic pump 34, the first relief valve 35, the second relief valve 37, the third relief valve 38, proportional valve 36, the first pressure sensor 39, the second pressure sensor 40 and controller 41. The hydraulic pump 34 is connected with the oil inlet of the proportional valve 36. The two outlets of the proportional valve 36 are connected to the driving oil access holes of the second x-direction micro-displacement actuator 25 and the first x-direction micro-displacement actuator 18 respectively. The first relief valve 35 is set on the connecting pipe between hydraulic pump 34 and the inlet of proportional valve 36. The second relief valve 37 is set on the connecting pipe between one of the outlets of the proportional valve 36 and the driving oil access hole of the second x-direction micro-displacement actuator 25. The third relief valve 38 is set on the connecting pipe between the other outlet of the proportional valve 36 and the driving oil access hole of the first x-direction micro-displacement actuator 18. Among them, the pump station motor 33 drives the hydraulic pump 34 to produce high-pressure oil, the proportional valve 36 adjusts the second x-direction micro-displacement actuator 25, and the first x-direction micro-displacement actuator 18 according to the controller 41 instruction to control the cavity pressure p1 and p2, the first relief valve 35, the second relief valve 37, and the third relief valve 38 are responsible for stabilizing and overflowing the pressure of the control cavity of the main circuit and the x-direction micro-displacement actuator, and the control cavity pressure p1 of the second x-direction micro-displacement actuator 25 is obtained through the second pressure sensor 40. The control cavity pressure p2 of the first x-direction micro-displacement actuator 18 is obtained by the first pressure sensor 39, and the pressure signal is transmitted to the controller 41. The controller 41 calculates the real-time output driving force $F=I(p1-p2)/2$ according to the pressure signals p1 and p2, the overall stiffness k and the action area I of the micro-displacement actuator, and measures the real-time displacement x with the guide rail slider system with displacement measurement function. By comparing with the expected displacement f, the control signal u is further generated to drive the proportional valve 36. By changing the micro-displacement actuator to control the cavity pressure p1 and p2, the closed-loop control of the displacement of the driven platform is realized.

An electro-hydraulic micro-displacement system disclosed in this embodiment can realize high-frequency and high-precision displacement and force control of micro-displacement actuators through a hydraulic drive system.

Embodiment 3

Figure 10:
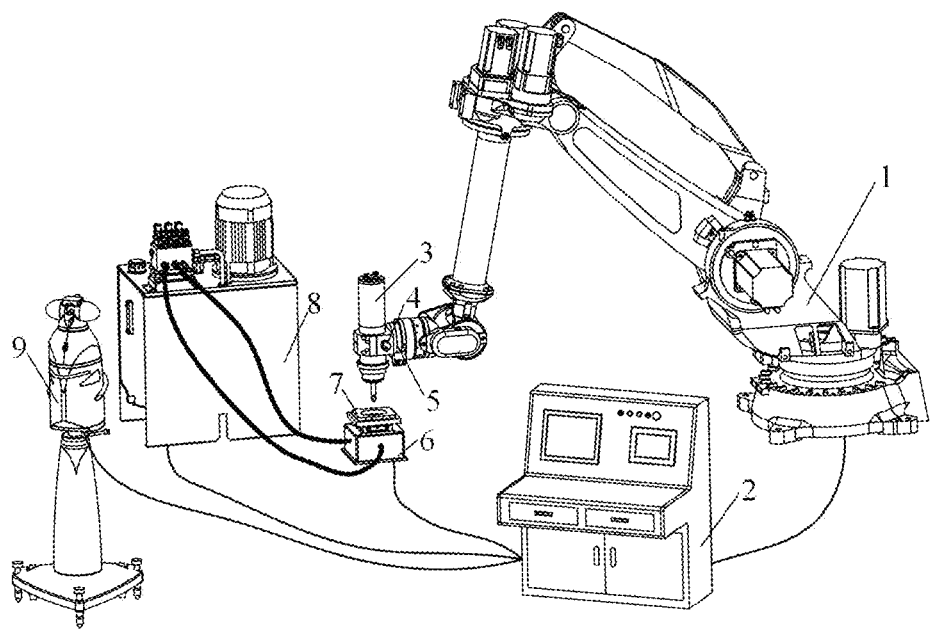
FIG. 10 is another structural diagram of the system in embodiment 3.

In this embodiment, a robot precision compensation system is disclosed, including the robot body 1, end-effector 3, an electro-hydraulic micro-displacement system disclosed in embodiment 2, measurement system 9, and control center 2. End-effector 3 is connected with the robot body 1. All hydraulic drive systems form a hydraulic station. As shown in FIG. 10, the electro-hydraulic micro-displacement platform 6 is used to place workpiece 7, and the position of the workpiece is adjusted by two x-direction micro-displacement actuators, two y-direction micro-displacement actuators and two z-direction micro-displacement actuators.

Figure 9:
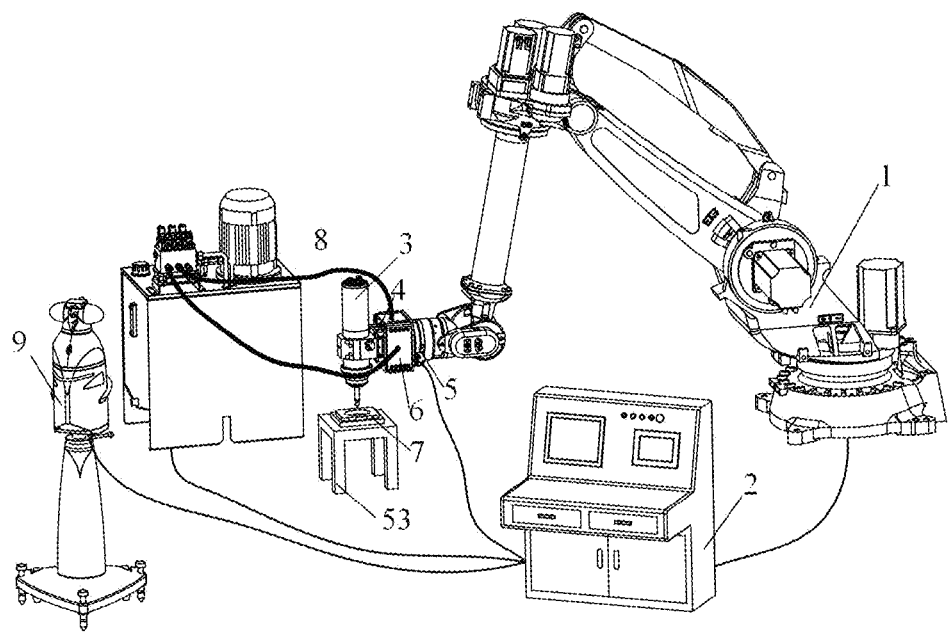
FIG. 9 is a structural diagram of the system in embodiment 3.

Or, as shown in FIG. 9, the electro-hydraulic micro-displacement platform 6 is connected between the robot body 1 and the end effector 3. Specifically, the electro-hydraulic micro-displacement platform 6 is connected to the end of the robot body 1 through the end flange 5, and the end effector 3 is connected to the workpiece mounting plate of the electro-hydraulic micro-displacement platform 6. The position of the end effector 3 is fine-tuned through the electro-hydraulic micro-displacement platform 6, and workpiece 7 is placed on the workpiece clamping platform 53. The relative position between the end effector and the workpiece is adjusted in real-time to improve the machining accuracy.

The measurement system 9 is used to obtain the real-time position of the end effector 3, and the robot body 1 is used to receive the motion command sent by the control center 2 and move according to the motion command sent by the control center 2. Control center 2 is used to obtain the position deviation according to the real-time position and ideal position of the end effector 3. The position deviation is decomposed into low-frequency position deviation and high-frequency position deviation. The motion command of the robot body is calculated by the low-frequency position deviation, and the motion command is used to control the movement of the robot body to compensate for the low-frequency position deviation. The high-frequency command is calculated by the high-frequency position deviation, and the high-frequency command is sent to the hydraulic station. The hydraulic station controls the output flow of the proportional valve according to the high-frequency command. Thus, the position of the workpiece or the position of the end effector 3 is adjusted by two x-direction micro-displacement actuators, two y-direction micro-displacement actuators, and two z-direction micro-displacement actuators to compensate for high-frequency position deviations.

Among them, the end effector 3 can be a machining tool for robots such as a milling motorized spindle, grinding motorized spindle, or welding torch. The end effector 3 is installed on the robot body 1 through the end flange 5.

The end effector positioning target ball 4 is installed on the end effector 3, and the end effector positioning target ball 4 is used to feedback on the real-time position of the end effector 3 to the measurement system 9.

When an electro-hydraulic micro-displacement platform is used to place a workpiece, the electro-hydraulic micro-displacement system can be one or more, and several electro-hydraulic micro-displacement platforms are used to place the same workpiece.

Specifically, according to the size of workpiece 7, the number of the electro-hydraulic micro-displacement platform can be selected. When workpiece 7 is small, a single electro-hydraulic micro-displacement platform is used to place workpiece 7. When workpiece 7 is large, several electro-hydraulic micro-displacement platforms can be selected to form an electro-hydraulic micro-displacement platform group. Workpiece 7 is placed through the electro-hydraulic micro-displacement platform group to ensure the support stability of workpiece 7.

The measurement system 9 can be a large-scale spatial pose measurement device such as a laser tracker.

The frequency response of the electro-hydraulic micro-displacement platform 6 is much higher than that of the robot body 1.

The control center establishes a unified global coordinate system. In the global coordinate system, the real-time position P′ of the end-effector 3 is obtained by measuring system 9, and the position deviation Δ is obtained by comparing it with the ideal position P of the end-effector 3. Control center 2 receives the position deviation Δ. The response frequency ω of the robot body 1 is set to the segmentation frequency. The position deviation Δ is obtained by the second-order low-pass filter to obtain the low-frequency position deviation Δ1, and the high-frequency position deviation Δ2=Δ−Δ1. The low-frequency command signal is calculated according to the low-frequency position deviation Δ1 and sent to the robot body 1. The high-frequency command signal is calculated according to the high-frequency position deviation Δ2 and sent to the hydraulic station 8. Robot body 1 moves according to the low-frequency command signal, and hydraulic station 8 controls the output flow of the servo proportional valve according to the high-frequency command signal, and further controls the displacement of the x-direction, y-direction, and z-direction micro-displacement actuators in the electro-hydraulic micro-displacement platform 6, thereby adjusting the position of the workpiece 7 or the end effector. After a working cycle, the measurement system 9 obtains the real-time position P′ adjusted by the end effector 3 again and recalculates the position deviation Δ according to the real-time position P′ and the ideal position P of the end effector 3. The position of the robot body 1 and the workpiece 7 or the end effector is adjusted according to the updated position deviation Δ, and the above process is repeated until the end of the machining path. At the same time, as shown in FIG. 8, according to the driving pressure difference between the two micro-displacement actuators in the same direction, the machining force F=S(p1−p2)/2 can be obtained, which is used for real-time monitoring of machining process, where S is the action area of the micro-displacement actuator.

A robot precision compensation system disclosed in this embodiment does not need to change the robot body structure, based on using the robot to compensate the low-frequency position deviation, the high-frequency position deviation between the robot and the workpiece is compensated by the electro-hydraulic micro-displacement platform with the high-frequency response, high stiffness and high precision, which improves the machining accuracy of the workpiece and expands the use of the robot in high-precision machining fields such as milling and drilling. The electro-hydraulic micro-displacement platform has a simple structure with convenient reconstruction and is suitable for upgrading the existing robot processing system, which is conducive to reducing the cost of high-precision machining.

Embodiment 4

Figure 11:
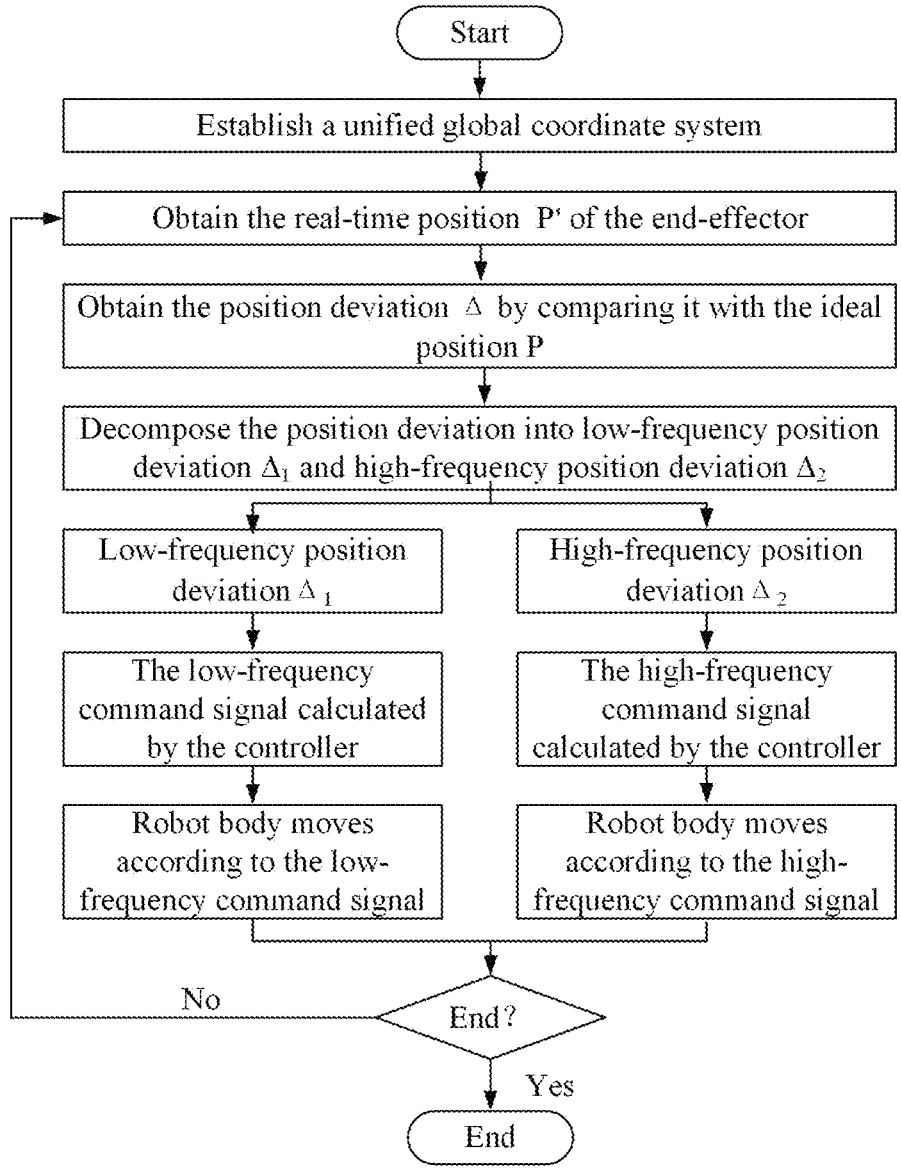
FIG. 11 is the flow chart of the method in embodiment 4.

In this embodiment, a compensation method for a robot precision compensation system is disclosed, as shown in FIG. 11, including:

Obtaining the real-time position of the end effector;

Obtaining the position deviation according to the real-time position and ideal position of the end effector; Decomposing the position deviation into low-frequency position deviation and high-frequency position deviation.

Calculating the motion command of the robot body by the low-frequency position deviation, and controlling the motion of the robot body by the motion command to compensate for the low-frequency position deviation.

The high-frequency command is calculated by the high-frequency position deviation, and the high-frequency command is sent to the hydraulic station. The hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

Finally, it should be noted that the above embodiments are only used to explain the technical solution of the invention rather than add limitations. Although the invention is described in detail regarding the above embodiments, the general technical personnel in the field should understand that the embodiments of the invention can still be modified or equivalently replaced without any modifications or equivalent replacements from the spirit and scope of the invention, which should be covered within the protection scope of the claims of the invention.

What is claimed is:

1. An electro-hydraulic micro-displacement platform, comprising: a frame, an x-direction guide rail arranged on the bottom plate of the frame, wherein the x-direction guide rail slidingly connected with a cross slider, the cross slider slidingly connected with a y-direction guide rail, a z-direction fixed platform is fixed on the y-direction guide rail, both ends of the z-direction fixed platform x-direction are connected with the x-direction micro-displacement actuator through the y-direction guide bearing, both ends of the z-direction fixed platform y-direction are connected with the y-direction micro-displacement actuator through the x-direction guide bearing, both the x-direction micro-displacement actuator and the y-direction micro-displacement actuator are connected with the side plate of the frame, and the z-direction fixed platform is connected with the z-direction floating platform through the first z-direction micro-displacement actuator; the z-direction floating platform is connected with the z-direction auxiliary fixed platform through the second z-direction micro-displacement actuator, the z-direction fixed platform is fixedly connected with the z-direction auxiliary fixed platform, and the z-direction floating platform is connected with the workpiece mounting plate; each micro-displacement actuator includes a variable-thickness disk structure I and a variable-thickness disk structure II; the variable-thickness disk structure I is connected with the variable-thickness disk structure II, and a control cavity is formed between the variable-thickness disk structure I and the variable-thickness disk structure II; a drive oil access hole is arranged on the variable-thickness disk structure II, and the control cavity is connected to the drive oil access hole; the y-direction guide bearing and the x-direction guide bearing both include a linear guide and a slider; the slider is connected to the micro-displacement actuator and can move along the linear guide; the z-direction fixed platform is connected to the x-direction and y-direction guide bearings respectively.

2. The electro-hydraulic micro-displacement platform according to claim 1, wherein the z-direction floating platform is connected to the z-direction slider, the z-direction slider is slidingly connected to the z-direction guide rail, one end of the z-direction guide rail is connected to the z-direction fixed platform, and the other end is connected to the z-direction auxiliary fixed platform.

3. The electro-hydraulic micro-displacement platform according to claim 1, further comprises slider guide systems, formed by the x-direction guide rail, the y-direction guide rail, the cross slider, the z-direction guide rail, and the z-direction slider are composed of displacement measurement function which measures the displacement of the z-direction floating platform in the x-axis, y-axis, and z-axis.

4. The electro-hydraulic micro-displacement platform according to claim 1, wherein the control cavity includes several stiffness-weakening areas and stiffness enhancement areas, and the stiffness-weakening areas and the stiffness enhancement areas are alternately arranged along the radial direction of the variable-thickness disk structure I.

5. An electro-hydraulic micro-displacement system including the electro-hydraulic micro-displacement platform according to claim 1 and three hydraulic drive systems, two x-direction micro-displacement actuators, two y-direction micro-displacement actuators, and two z-direction micro-displacement actuators connected to the three hydraulic drive systems one by one; each hydraulic drive system includes a controller, a hydraulic pump, a proportional valve, overflow valves, and a pressure sensor; the hydraulic pump is connected with the oil inlet of the proportional valve, and the two oil outlets of the proportional valve are respectively connected with the drive oil access holes of the two micro-displacement actuators; the overflow valves are respectively arranged on the pipeline connecting the hydraulic pump with the oil inlet, and the pipeline connecting the oil outlet with the drive oil access hole; the pressure sensor is used to obtain the pressure in the control cavity of each micro-displacement actuator, and the controller is used to calculate the output force of each micro-displacement actuator according to the pressure in the control cavity and is also used to obtain the output displacement of each micro-displacement actuator; the output displacement of each micro-displacement actuator is compared with the expected displacement to obtain the control signal, and the proportional valve is controlled by the control signal.

6. An electro-hydraulic micro-displacement system including the electro-hydraulic micro-displacement platform according to claim 2 and three hydraulic drive systems, two x-direction micro-displacement actuators, two y-direction micro-displacement actuators, and two z-direction micro-displacement actuators connected to the three hydraulic drive systems one by one; each hydraulic drive system includes a controller, a hydraulic pump, a proportional valve, overflow valves, and a pressure sensor; the hydraulic pump is connected with the oil inlet of the proportional valve, and the two oil outlets of the proportional valve are respectively connected with the drive oil access holes of the two micro-displacement actuators; the overflow valves are respectively arranged on the pipeline connecting the hydraulic pump with the oil inlet, and the pipeline connecting the oil outlet with the drive oil access hole; the pressure sensor is used to obtain the pressure in the control cavity of each micro-displacement actuator, and the controller is used to calculate the output force of each micro-displacement actuator according to the pressure in the control cavity and is also used to obtain the output displacement of each micro-displacement actuator; the output displacement of each micro-displacement actuator is compared with the expected displacement to obtain the control signal, and the proportional valve is controlled by the control signal.

7. An electro-hydraulic micro-displacement system including the electro-hydraulic micro-displacement platform according to claim 3 and three hydraulic drive systems, two x-direction micro-displacement actuators, two y-direction micro-displacement actuators, and two z-direction micro-displacement actuators connected to the three hydraulic drive systems one by one; each hydraulic drive system includes a controller, a hydraulic pump, a proportional valve, overflow valves, and a pressure sensor; the hydraulic pump is connected with the oil inlet of the proportional valve, and the two oil outlets of the proportional valve are respectively connected with the drive oil access holes of the two micro-displacement actuators; the overflow valves are respectively arranged on the pipeline connecting the hydraulic pump with the oil inlet, and the pipeline connecting the oil outlet with the drive oil access hole; the pressure sensor is used to obtain the pressure in the control cavity of each micro-displacement actuator, and the controller is used to calculate the output force of each micro-displacement actuator according to the pressure in the control cavity and is also used to obtain the output displacement of each micro-displacement actuator; the output displacement of each micro-displacement actuator is compared with the expected displacement to obtain the control signal, and the proportional valve is controlled by the control signal.

8. An electro-hydraulic micro-displacement system including the electro-hydraulic micro-displacement platform according to claim 4 and three hydraulic drive systems, two x-direction micro-displacement actuators, two y-direction micro-displacement actuators, and two z-direction micro-displacement actuators connected to the three hydraulic drive systems one by one; each hydraulic drive system includes a controller, a hydraulic pump, a proportional valve, overflow valves, and a pressure sensor; the hydraulic pump is connected with the oil inlet of the proportional valve, and the two oil outlets of the proportional valve are respectively connected with the drive oil access holes of the two micro-displacement actuators; the overflow valves are respectively arranged on the pipeline connecting the hydraulic pump with the oil inlet, and the pipeline connecting the oil outlet with the drive oil access hole; the pressure sensor is used to obtain the pressure in the control cavity of each micro-displacement actuator, and the controller is used to calculate the output force of each micro-displacement actuator according to the pressure in the control cavity and is also used to obtain the output displacement of each micro-displacement actuator; the output displacement of each micro-displacement actuator is compared with the expected displacement to obtain the control signal, and the proportional valve is controlled by the control signal.

9. A robot precision compensation system including a robot body, an end effector, the electro-hydraulic micro-displacement system according to claim 5, a measurement system, and a control center; the end effector is connected to the robot body, and all hydraulic drive systems form a hydraulic station; an electro-hydraulic micro-displacement platform is used to place the workpiece, or an electro-hydraulic micro-displacement platform is connected between the end effector and the robot body; the measurement system is used to obtain the real-time position of the end effector, and the control center is used to obtain the position deviation according to the real-time position and the ideal position of the end effector; the position deviation is decomposed into low-frequency position deviation and high-frequency position deviation; the motion command of the robot body is calculated by the low-frequency position deviation, and the motion command is used to control the motion of the robot body to compensate for the low-frequency position deviation; the high-frequency command is calculated by the high-frequency position deviation, and the high-frequency command is sent to the hydraulic station; the hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

10. The robot precision compensation system according to claim 9, wherein the end effector positioning target ball is installed on the end effector, and the end effector positioning target ball is used to feedback on the position of the end effector to the measurement system.

11. The robot precision compensation system according to claim 9, wherein when an electro-hydraulic micro-displacement platform is used to place a workpiece, the electro-hydraulic micro-displacement system can be one or more, and several electro-hydraulic micro-displacement platforms are used to place the same workpiece.

12. A compensation method of the robot precision compensation system according to claim 9, comprising:
    obtaining the real-time position of the end effector;
    obtaining the position deviation according to the real-time position and ideal position of the end effector;
    decomposing the position deviation into low-frequency position deviation and high-frequency position deviation; and
    calculating the motion command of the robot body by the low-frequency position deviation, and controlling the motion of the robot body by the motion command to compensate for the low-frequency position deviation;
    wherein the high-frequency command is calculated by the high-frequency position deviation, and the high-frequency command is sent to the hydraulic station; the hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

13. A compensation method of the robot precision compensation system according to claim 10, comprising:
    obtaining the real-time position of the end effector;
    obtaining the position deviation according to the real-time position and ideal position of the end effector;
    decomposing the position deviation into low-frequency position deviation and high-frequency position deviation; and
    calculating the motion command of the robot body by the low-frequency position deviation, and controlling the motion of the robot body by the motion command to compensate for the low-frequency position deviation;
    wherein the high-frequency command is calculated by the high-frequency position deviation, and the high-frequency command is sent to the hydraulic station; the hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

14. A compensation method of the robot precision compensation system according to claim 11, comprising:
    obtaining the real-time position of the end effector;
    obtaining the position deviation according to the real-time position and ideal position of the end effector;
    decomposing the position deviation into low-frequency position deviation and high-frequency position deviation; and
    calculating the motion command of the robot body by the low-frequency position deviation, and controlling the motion of the robot body by the motion command to compensate for the low-frequency position deviation;
    wherein the high-frequency command is calculated by the high-frequency position deviation, and the high-frequency command is sent to the hydraulic station; the hydraulic station controls the output flow of the proportional valve through the high-frequency command, to adjust the position of the workpiece or the position of the end effector through two x-direction micro-displacement actuators, two y-direction micro-displacement actuators and two z-direction micro-displacement actuators to compensate the high-frequency position deviation.

* * * * *